(12) United States Patent
Taguchi et al.

(10) Patent No.: US 6,733,552 B1
(45) Date of Patent: May 11, 2004

(54) HYDROGEN GENERATING APPARATUS

(75) Inventors: Kiyoshi Taguchi, Moriguchi (JP);
Takeshi Tomizawa, Ikoma (JP);
Kunihiro Ukai, Ikoma (JP); Toshiyuki Shono, Kyoto (JP); Kouichiro Kitagawa, Kadoma (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/524,160

(22) Filed: Mar. 13, 2000

(30) Foreign Application Priority Data

Mar. 15, 1999 (JP) .......................... 11-068955
Mar. 25, 1999 (JP) .......................... 11-081076
Apr. 20, 1999 (JP) .......................... 11-112787

(51) Int. Cl.$^7$ .................................. B01J 8/02
(52) U.S. Cl. ................... 48/127.9; 48/61; 48/62 R;
48/63; 48/89; 48/94; 48/95; 48/119; 48/198.1;
48/198.3; 48/198.7; 48/211; 48/212; 48/214 R;
48/215; 422/188; 422/189; 422/190; 422/198;
422/211; 422/217; 422/222
(58) Field of Search ...................... 422/188, 189,
422/190, 198, 211, 217, 222; 48/61, 62 R,
63, 89, 94, 95, 119, 127.9, 197 R, 198.1,
198.3, 198.7, 211, 212, 214 R, 215

(56) References Cited

U.S. PATENT DOCUMENTS

| | | | | |
|---|---|---|---|---|
| 3,666,682 A | * | 5/1972 | Muenger | 252/373 |
| 3,900,646 A | * | 8/1975 | Clyde | 427/595 |
| 3,919,114 A | * | 11/1975 | Reynolds | 252/373 |
| 4,863,707 A | * | 9/1989 | McShea, III et al. | 423/359 |

FOREIGN PATENT DOCUMENTS

| | | |
|---|---|---|
| EP | 0 833 401 A2 | 4/1998 |
| EP | 0 834 948 A2 | 4/1998 |
| EP | 0 887 306 A1 | 12/1998 |
| EP | 0 985 635 A1 | 3/2000 |
| JP | 10-101303 | 4/1998 |
| JP | 10-139402 | 5/1998 |
| WO | WO 91/10496 | 7/1991 |

\* cited by examiner

Primary Examiner—Jerry D. Johnson
Assistant Examiner—Basia Ridley
(74) Attorney, Agent, or Firm—Akin Gump Strauss Hauer & Feld LLP (57) ABSTRACT

A hydrogen generating apparatus having a fuel feeding part, a water feeding part for fuel reforming, an oxidant gas feeding part, a reforming catalyst body, a heating part for the reforming catalyst, a CO shifting catalyst body and a CO purification catalyst body is provided wherein the reforming catalyst body, the CO shifting catalyst body and the CO purification catalyst body are sequentially ordered from the fuel feeding part toward the downstream side, and wherein a shifting catalyst of the shifting catalyst body contains as one component at least a platinum group-type catalyst. A fuel and water are fed to the reforming part which has been heated, and an oxidant gas from the oxidant gas feeding part is nixed with each of a reformed gas introduced into the shifting part and a shifted gas obtained in the shifting part and introduced into the purification part, wherein at least a part of the reformed gas and at least a part of the shifted gas are oxidized, respectively, in the shifting part and the purification part.

11 Claims, 6 Drawing Sheets

HYDROGEN GENERATING APPARATUS

BACKGROUND OF THE INVENTION

The present invention relates to a hydrogen generating, apparatus which uses a fuel hydrocarbon or the like and water as raw materials and gives a hydrogen gas by steam reforming of the fuel.

For producing hydrogen, there are methods of steam reforming of fuels. In these methods, fuels such as natural gas, hydrocarbons like LPG, alcohols like methanol, naphtha and the like and water are used as raw materials and the fuels are subjected to a steam reforming reaction in a reforming part or reactor equipped with a reforming catalyst to generate hydrogen. There is also provided a shifting part conventionally for shifting water and carbon monoxide since carbon monoxide is produced as a by-product in the above-described steam reforming reaction.

Further, when a steam reforming method is used for supplying hydrogen to fuel cells, particularly to a solid polymer fuel cell, a purification part utilizing a carbon monoxide oxidizing method, methanization method or the like is provided for further removal of carbon monoxide in a shifted gas passed through a shifting part. The above-described reforming part, shifting part and purification part are equipped with catalysts corresponding to respective reactions and the reaction temperatures differ depending on the catalysts, therefore, there is a need to heat respective catalysts to respective reaction temperatures for stable generation of hydrogen.

In such hydrogen generating apparatuses, the temperature in the reforming part is most high and the temperature lowers gradually in the order of the reforming part, the shifting part into which a reformed gas flows in and the purification part into which a shifted gas flow in since a heating part is provided only in the reforming part situated at the upstream side. Therefore, there has been adopted a constitution in which the shifting part and the purification part are heated sequentially with heat from the reforming part, for example, heat kept in reformed gas or surplus heat in the heating part.

In such constitution, however, a long time is required before the catalyst temperatures of respective reaction parts (reforming part, shifting part and purification part) are stabilized. Surely, there is no specific problem in a hydrogen generating apparatus which is usually operated in continuous mode used in a plant and the like since the operation can be effected while estimating the starting-up time. However, such constitution is not preferable in a hydrogen generating apparatus which effects frequent starting up and stopping and needs stable generation of hydrogen in a short period of time.

On the other hand, there is also used a method in which special heating parts are provided to respective reforming part and purification part and the starting-up time is shortened by allowing the heating parts to actuate when catalysts are heated in starting up the apparatus. This method, however, has a problem that constitution becomes complicated or the cost of the apparatus increases due to integration of the heating parts into the apparatus.

The first object of the present invention is to provide a hydrogen generating apparatus assuming daily starting-up and stopping in which the temperatures of catalysts in respective reaction parts can be stabilized in a short period of time by a simple constitution, in view of the above-described facts.

In the above-described steam reforming, hydrocarbon-based fuels such as methane, propane, gasoline, kerosene and the like are reformed at temperatures from about 500 to 800° C., and alcohol and ether-based fuels are reformed at temperatures from about 200 to 400° C.

In this reforming, higher the reaction temperature, higher the concentration of carbon monoxide (CO) generated, therefore, particularly when hydrocarbon-based fuel is used, a CO shifting catalyst is used and CO and steam are reacted to reduce the CO concentration down to 0.1 to 1% for example.

Particularly in the case of a fuel cell which works at a lower temperature of about 100° C. like a solid polymer fuel cell, there is required decrease in the CO concentration down to several ppm level, hence causing use of a CO purification catalyst which selectively oxidizes CO by addition of a trace amount of air. This catalyst has been used as a catalyst body having a form of pellet such as cylindrical, spherical and the like.

However, when a catalyst body in the form of a pellet is used, there has been a problem that since the catalyst body collapses due to heat impact in each starting Lip of a fuel cell and vibration in being mounted on vehicles and the like, the catalyst can not be used until the life inherent to the catalyst component due to generated need of exchange with a novel catalyst body. There has been also a possibility that a catalyst powder produced by collapsing of the catalyst body obstructs the fuel flow route of a fuel cell.

Namely, conventional hydrogen generating apparatuses have no large problem in uses wherein only stationary operation is conducted in chemical plants and the like and frequent starting up operation is not required, however have problems in uses wherein stopping of operation and starting up are repeated and vigorous vibration occurs such as in fuel cells for domestic use or for vehicle use.

The second object of the present invention is to provide a hydrogen generating apparatus which can allow the ability of a catalyst body to be fully manifested and can provide utilization of the full life of the catalyst body, causing stable operation for a long period of time, even in uses wherein stopping of operation and starting up are repeated and vigorous vibration occurs, in view of the above-described facts.

Further, conventional hydrogen generating apparatuses which provide generation of hydrogen by the above-described steam reforming have no means provided between these reforming catalyst body, CO shifting catalyst body and CO purification catalyst body to prevent catalyst components from scattering.

When means to prevent scatter of a catalyst are not provided, there is a possibility that heat impact is applied to a catalyst body in starting up the hydrogen generating apparatus, a catalyst body collapses due to vibration when placed on vehicles, and when used for a long period of time, fallen catalyst components fly to the downstream side of a catalyst body.

In this case, the scattered reforming catalyst methanizes a reformed gas, the scattered CO shifting catalyst prevents selective oxidation of CO and increases the CO concentration by a reverse shift reaction, providing a factor causing reduction in efficiency of the whole apparatus.

Thus, conventional methods have no large problem in uses wherein only stationary operation is conducted in chemical plants and the like and frequent starting up operation is not required, however have a lot of problems in uses wherein stopping of operation and starting up are repeated and vigorous vibration occurs such as in fuel cells for domestic use or for vehicle use.

The third object of the present invention is to provide a hydrogen generating apparatus which eliminates influence by scatter of a catalyst body and operates in a stable manner for a long period of time, for solving the above-described problems of hydrogen generating apparatuses, in view of the above-described facts.

BRIEF SUMMARY OF THE INVENTION

The present invention provides, for first attaining the above-described first object, a hydrogen generating apparatus comprising a fuel feeding part, a water feeding part for fuel reforming, an oxidant gas feeding part, a reforming catalyst body, a heating part for the above-described reforming catalyst, a CO shifting catalyst body and a CO purification catalyst body and in which the reforming catalyst body, the CO shifting catalyst body, the CO purification catalyst body being placed sequentially in this order form the above-described fuel feeding part toward the downstream side, wherein a fuel and water are fed to the above-described reforming part which has been heated, an oxidant gas from the above-described oxidant gas feeding part is mixed with each of the above-described reformed gas introduced into the above-described shifting part and a shifted gas obtained in the above-described shifting part and introduced into the above-described purification part, and at least a part of the above-described reformed gas and at least a part of the above-described shifted gas are oxidized respectively in the above-described shifting part and the above-described purification part.

The above-described fuel feeding part and the water feeding part may be integrated, and the CO shifting catalyst is a catalyst which allows shift reaction of water and carbon monoxide.

In this case, it is preferable that a shifting catalyst of the above-described shifting catalyst body contains as one component at least a platinum group-type catalyst.

Further, it is preferable that a hydrogen generating apparatus has a shifting catalyst temperature measuring part which measures the temperature of the above-described shifting catalyst body and the temperature of the shifting catalyst is controlled by controlling the amount of an oxidant gas to be mixed with the above-described reformed gas.

Furthermore, it is preferable that a hydrogen generating apparatus has a purification catalyst temperature measuring part which measures the temperature of the above-described purification catalyst body and the temperature of the purification catalyst is controlled by controlling the amount of an oxidant gas to be mixed with the above-described shifted gas.

Still further, it is preferable that an oxidant gas from the above-described oxidant gas feeding part is mixed with a fuel and water from the above-described fuel feeding part and the water feeding part.

Moreover, it is preferable that a hydrogen generating apparatus has a reforming catalyst temperature measuring part which measures the temperature of the above-described reforming catalyst body and the temperature of the reforming catalyst is controlled by controlling the amount of an oxidant gas to be mixed with the above-described fuel and water.

In the hydrogen generating apparatus of the present invention, it is preferable, for attaining the above-described second object, that the reforming catalyst body, CO shifting catalyst body and CO purification catalyst body comprise a carrier or support having a honeycomb structure, foamed body structure or corrugated structure which carries a catalyst component.

It may be advantageous that a hydrocarbon fuel, alcohol fuel or ether fuel is fed from the above-described fuel feeding part.

Further, it is preferable that the above-described water feeding part for fuel reforming feeds also air together with steam.

Also, it is preferable that the above-described water feeding part for fuel reforming feeds only air.

As materials constituting the above-described carrier, heat-resistant inorganic materials, metals and heat-conductive inorganic materials are exemplified. Further, the above-described carrier may be constituted of a complex material composed of heat-resistant inorganic materials and metals or heat-conductive inorganic materials.

Furthermore, the hydrogen generating apparatus of the present invention has, for attaining the above-described third object, the above-described scatter preventing means provided at least between the above-described reforming catalyst body and the above-described CO shifting catalyst body or between the above-described CO shifting catalyst body and the above-described CO purification catalyst body.

It is preferable that the above-described scatter preventing means is a filter and a pressure detecting apparatus which detects pressure loss caused the above-described filter is placed at the upstream side and at the downstream side of the above-described filter.

As the above-described filter, filters are exemplified constituted of fiber composed of a metal, ceramics or complex thereof. There can also be used filters composed of a metal, ceramics or complex thereof in the form of mesh, honeycomb or foam.

In the hydrogen generating apparatus of the present invention, it is preferable that the temperature of the above-described filter is higher than the temperature at which a reformed gas is methanized.

Further, it is preferable that a temperature detecting apparatus is provided at a position near the above-described filter.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

For easy understanding, the present invention will be explained by the below embodiments by referring to drawings.

Embodiment 1

One embodiment of the hydrogen generating apparatus of the present invention will be first described.

Figure 1:
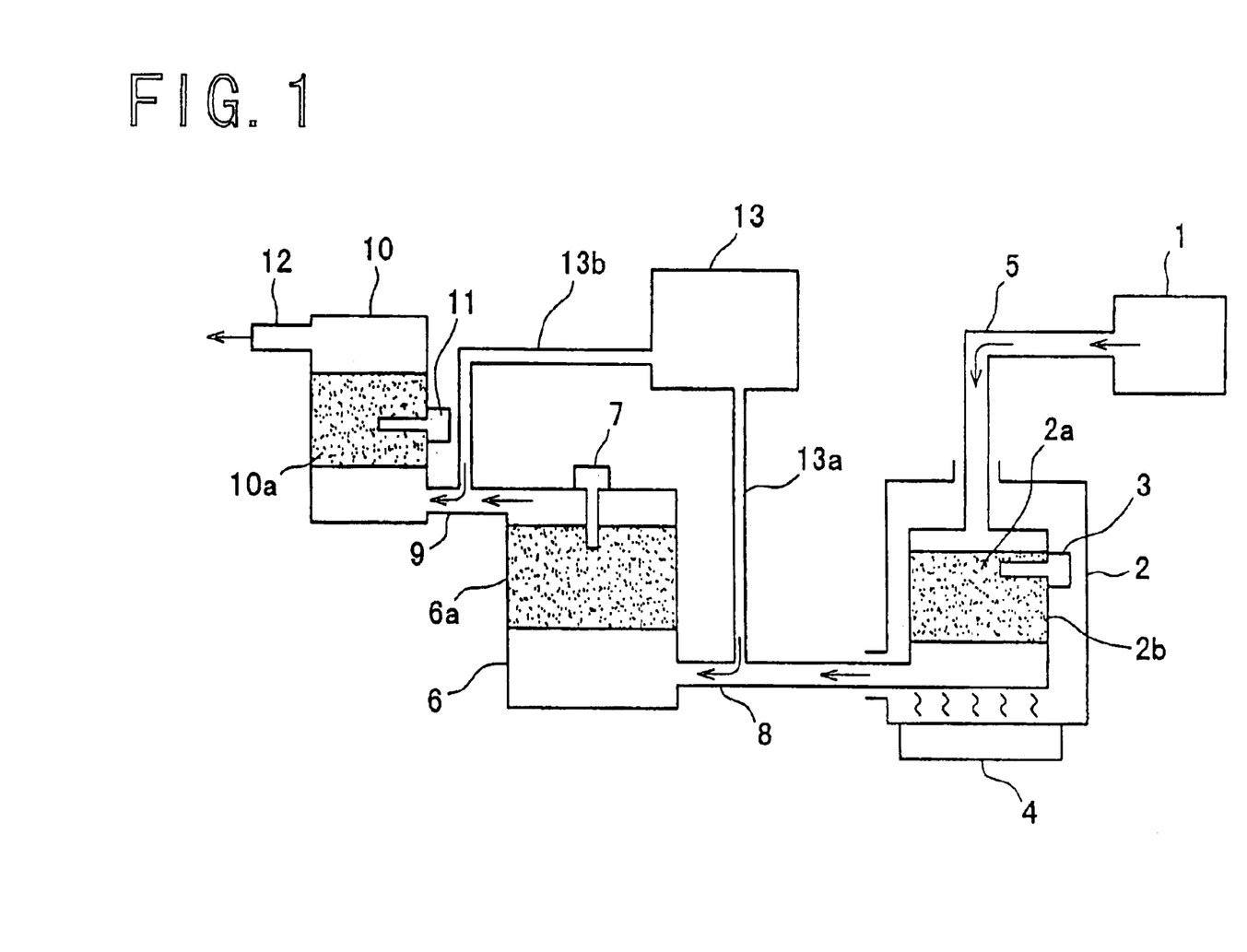
FIG. 1 is a schematic longitudinal section view showing the constitution of a hydrogen generating apparatus of one embodiment in accordance with the present invention.

FIG. 1 is a schematic longitudinal section view showing the constitution of a hydrogen generating apparatus according to one embodiment of the present invention. In FIG. 1, water and fuels such as hydrocarbons and the like which are raw materials for a steam reforming reaction are fed from a raw material feeding part I acting simultaneously as a fuel feeding part and a water feeding part for fuel reforming. Namely, in this embodiment, the fuel feeding part and the water feeding part for fuel reforming are integrated into one part.

In a reforming part 2, a reforming catalyst part 2b for accommodating a reforming catalyst 2a for a steam reforming reaction is provided and it steam-reforms a fuel. Herein, as the reforming catalyst 2a, there are used, for example, catalyst prepared from platinum group noble metals and the like.

A reforming catalyst temperature measuring part 3 detects the temperature of the reforming catalyst 2a carried oil the reforming catalyst body 2b. A heating part 4 is for heating the reforming part 2 in steam-reforming a fuel, and herein, a flame burner is used for example.

A shifting part 6 accommodates a shifting catalyst body 6a, and allows carbon monoxide in the reformed gas obtained in the reforming part 2 to shift. Furthers a shifting catalyst temperature measuring part 7 is provided for detecting the temperature of the shifting catalyst body 6a. Herein, as the catalyst to be carried on the shifting catalyst body 6a, there are used catalysts prepared from platinum group noble metals or catalysts containing at least copper, for example.

A purification part 10 has a purification catalyst body 10a such as, for example, platinum group-type oxidizing catalysts and the like provided inside, and oxidizes and/or hydrogenates carbon monoxide in the shifted gas obtained in tie shifting part 6, to purify the shifted gas. Further, purification catalyst temperature measuring part 11 is provided.

A raw material feeding route or path 5 is provided from the raw material feeding part 1 to the reforming part 2, and a reformed gas feeding route 8 is provided for feeding a reformed gas from the reforming part 2 to the shifting part 6. Further, a shifted gas feeding route 9 is provided for feeding a shifted gas from the shifting part 6 to the purification part 10. The purified gas (hydrogen) obtained in the purification part 10 is discharged through a hydrogen discharging route 12.

Further, from an oxidant gas-feeding part 13, an oxidant gas such as air and the like is fed to the reformed gas feeding route via a first route 13a and an oxidant gas is fed to the shifted gas feeding route 9 via a second route 13b.

Then, movement of the hydrogen generating apparatus of Embodiment 1 in generating hydrogen, which is characteristic to the present invention will be explained.

The hydrogen generating apparatus of the present invention has the heating part 4 provided only in the reforming part 2 on the most upstream side, and allows this heating part 4 to operate and heat the reforming catalyst 2a. Further, water and a fuel such as a hydrocarbon and the like which are raw material are allowed to contact with the reforming catalyst 2a heated through the raw material feeding route 5 from the raw material feeding part 1, for facilitating of a steam reforming reaction.

As described above, the gas discharged from the reforming part (reformed gas) is introduced into the shifting part 6 via the reforming gas feeding route 8, subsequently, the shifted gas obtained in the shifting part 6 is introduced into the purification part 10 through the shifted gas feeding route 12. Further, the purified gas (hydrogen) obtained in the purification part 10 is discharged to outside through the hydrogen discharging route 9 and fed to a fuel cell and the like, for example.

In this constitution, air is fed from the oxidant gas-feeding part 13 through the first route 13a and the second route 13b to the reformed gas and shifted gas to be mixed. By this mechanism, the catalyst temperature in the shifting part 6 and the purification part 10 can be increased and stabilized even if a heating part is not provided in the shifting part 6 and the purification part 10 and the heating part 4 is provided only in the reforming part 2.

For starting up a hydrogen generating apparatus at room temperature and feeding, in a stable manner, hydrogen (purified gas) containing a small amount of carbon monoxide, it is necessary that catalysts in the shifting part 6 and the purification part 10 are heated to suitable temperatures. Then, the hydrogen generating apparatus of the present invention utilizes effectively heats of the reformed gas and the shifted gas and stabilizes the catalyst temperature of each reaction part in a short period of time, irrespective of the heating part provided only in the reforming part 2.

Namely, the hydrogen generating apparatus of the present invention is characterized in that an oxidant gas such as air is previously fed and mixed not only with a shifted gas introduced into the purification part, which oxidizes carbon monoxide and decreases the amount thereof, but also with a reformed gas introduced into the shifting part.

Next, there will be illustrated more in detail how the catalyst temperature in each reaction part in the hydrogen generating apparatus of the present invention having such constitution is stabilized.

The reforming part 2 is heated by the heating part 4 to increase quickly the temperature of the reforming catalyst body 2b. The fuel reformed by the reforming catalyst 2a becomes a reformed gas, then, shifted in the shifting part 6 to become a shifted gas. Then, the shifted gas purifies carbon monoxide contained in the purification part 10.

In this embodiment of the present invention, air from the oxidant gas feeding part is fed and mixed with a reformed gas before introduced into the shifting part 6 and a shifted gas before introduced into the purification part 10. By this, oxygen in the fed air and a part of the reformed gas and a part of the shifted gas cause oxidation reactions in the shifting part 6 and the purification part 10, generating oxidation heats. By these heats, catalysts in the shifting part 6 and the purification part 10 are heated quickly to temperatures suitable for the reactions.

In the present invention, since heat generated in the shifting catalyst body 6a and the purification catalyst body 10a are utilized, the amount of such generated heat can be controlled by the amount of air fed and the control of the catalyst temperature also becomes easy.

Further, since a large amount of hydrogen is contained in the reformed gas by a steam reforming reaction of a fuel such as a hydrocarbon and the like, an oxidation reaction can be progressed easily even if catalysts in the shifting part and the purification part are in low temperature condition directly after starting up.

According to Embodiment 1 of the present invention, the catalyst in each reaction part can be heated to an appropriate temperature in a shorter period of time than that in a constitution wherein the shifting part and the purification part are heated sequentially, by using only heat kept in the reformed gas, since each reaction part can be heated separately. Also, a relatively simple constitution is possible in which an oxidant gas-feeding part 13 is only added.

In this embodiment, an appropriate treatment can be made even if the flow rates of raw materials to be fed (fuel and water) change. When a small amount of raw materials are fed, since the relative amount of heat kept in the reformed gas decreases, there is a tendency that temperatures lower in the shifting part and the purification part. Further reason for this is that it becomes possible to cause heat generation and maintain temperature in each reaction part by controlling the amount of air fed depending on the lowering of the temperature.

EXAMPLE 1

The hydrogen generating apparatus according to Embodiment 1 described above was actually allowed to operate. First, operation in starting up the apparatus will be described.

The heating part 4 was allowed to operate to initiate heating of the reforming part 2. Then, a methane gas, which was a hydrocarbon, was used as a fuel, which was a raw material, and 2 mol or more water was added per 1 mol of a methane gas, and fed to the reforming catalyst 2a (catalyst prepared from platinum group-type noble metal) in the reforming part 2. The heating quantity in the heating part 4 was controlled so that the temperature of the reforming catalyst became about 700□ C. for proceeding of the steam reforming reaction.

Then, the resultant reformed gas was fed to the shifting part 6 filled with a platinum group-type noble metal catalyst. In the shifting part 6, the content of carbon monoxide in the reformed gas is decreased by the shifting reaction with water. It is necessary that the shifting catalyst body 6a is heated quickly to a temperature from about 200 to 350□ C. for proceeding the shift reaction. Then, air was fed to the reformed gas, a part of the reformed gas component was oxidized using a shifting catalyst body 6a, and the catalyst was heated to a temperature suitable for the reaction. The amount of air to be fed was controlled based on the detected temperature by the shifting catalyst temperature measuring part, so that, in the present example, the upper limit temperature was 350° C.

Then, the shifted gas obtained in the shifting part 6 was mixed with air fed and introduced into the purification part 10. In the purification part 10, carbon monoxide is oxidized with oxygen and removed.

Also in the purification part 10, at least a part of the shifted gas component is oxidized by using a purification catalyst body 10a carrying a purification catalyst (platinum group-type oxidation catalyst), and the catalyst is heated to a temperature suitable for the reaction, similarly in the shifting part 6. The amount of air to be fed was controlled so that, in the present example, the detected temperature in the purification catalyst temperature measuring part was from 100 to 200° C.

The amounts of air fed to the shifting part 6 and the purification part 10 have to be set depending on the amount of hydrogen to be generated. In the present example as described above, by feeding air to the shifting part 6 and the purification part 10 and by heating each reaction part, the time until the catalyst temperature in each reaction part reached the temperature suitable for the reaction could be shorted to about one-forth as compared with the case in which air is not fed in the constitution of the present invention.

Then, the hydrogen generating apparatus was operated to give stationary state.

Heating operation in the heating part 4 was controlled so that the temperature of the reforming catalyst was about 700° C., and the steam reforming reaction was proceeded in a stable manner. In this stationary state, feeding of air was stopped at the flow rate which could maintain the temperature of the shifting part by the heat kept in the reformed gas.

In this case, in the purification part 10, carbon monoxide could be oxidized (purified) by feeding air containing oxygen at an amount corresponding to at least a half amount of carbon monoxide in the shifted gas, even if the temperature reached to 100 to 200° C.

Further, even if the amount of raw materials to be fed were changed, the hydrogen generating apparatus could reach the stationary state quickly.

When the amount of raw materials fed was changed tip to 3-fold, the catalyst temperature changed significantly if air was not fed depending on the catalyst temperature. Resultantly, the concentration of carbon monoxide at the exit of the purification part 10 revealed a value about 10 times larger than that in stationary operation.

On the other hand, it was confirmed that when air was fed depending on the catalyst temperature, approximately the same carbon monoxide concentration as that in stationary operation could be maintained.

In the present example, the amount of air fed was controlled by the catalyst temperature typified by the detected temperature at each catalyst temperature measuring part, however, if the apparatus operation conditions are apparent, the amount of air to be fed may be set depending on the conditions.

While air was fed as a gas containing oxygen, any one may be permissible provided it is a gas containing oxygen. Further, the flame burner was used as the heating part 4, however, any heating means may be permitted providing it can heat the reforming catalyst.

Embodiment 2

Next, another embodiment of the hydrogen generating apparatus of the present invention will be described.

Figure 2:
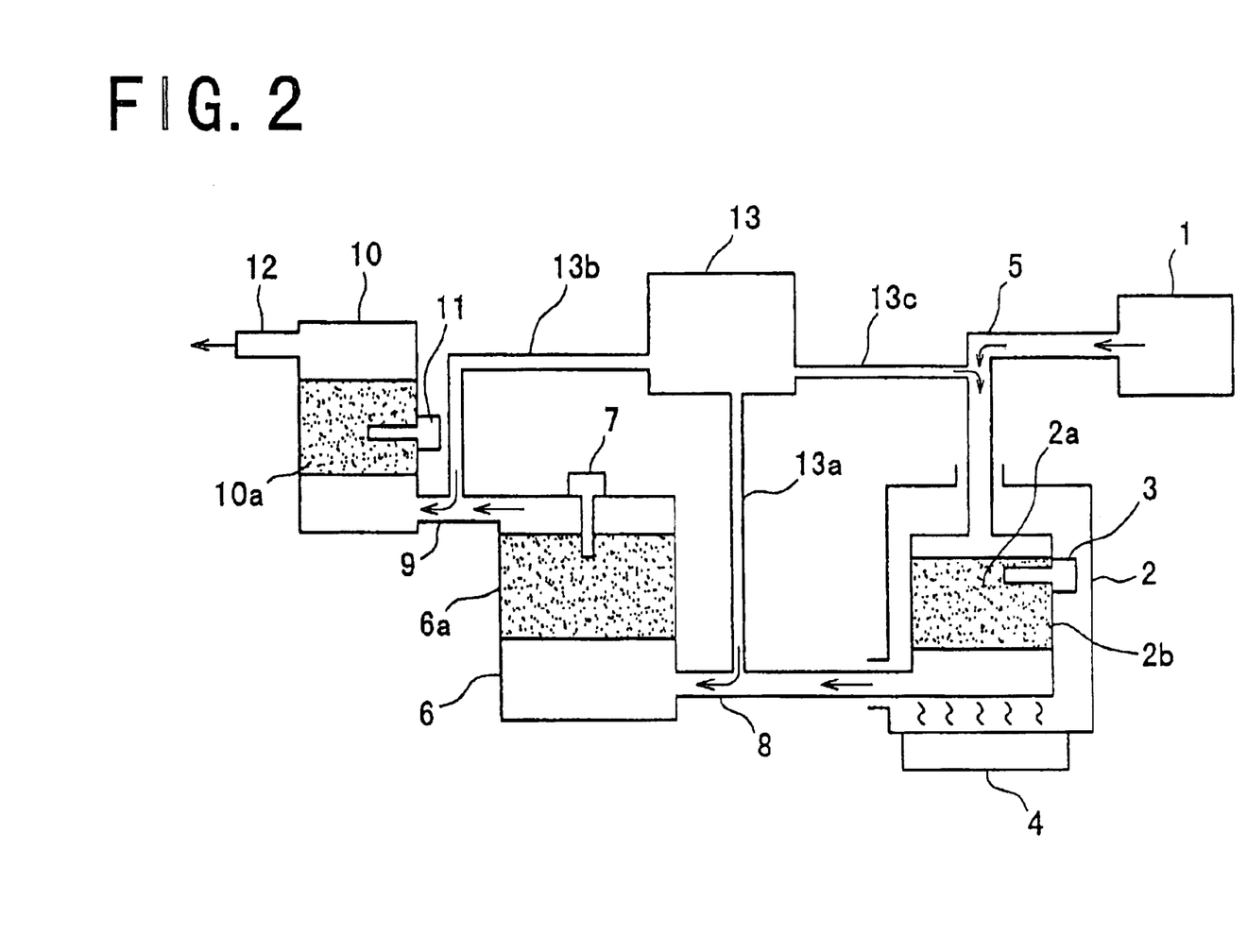
FIG. 2 is a schematic longitudinal section view showing the constitution of a hydrogen generating apparatus of another embodiment in accordance with the present invention.

FIG. 2 is a schematic longitudinal section view showing the constitution of a hydrogen generating apparatus according to one embodiment of the present invention. The hydrogen generating apparatus shown in FIG. 2 has basically the same constitution as the hydrogen generating apparatus shown in FIG. 1, and effects the same operation. In this description, explanations of the same parts of them are eliminated, and only different parts are illustrated.

The different parts include a point in which a third route 13c is provided on the oxidant gas-feeding part 13 and air is fed through the third route to raw materials (fuel and water) before introduced into the reforming part 2.

Also regarding the reforming catalyst in the reforming part 2, it is necessary, in starting up, that heating is conducted quickly up to the temperature suitable for the reaction. Therefore, the present embodiment adopts a constitution in which air is fed to raw materials before introduced into the reforming part 2 and a part of the raw materials is oxidized by using a reforming catalyst to heat the reforming catalyst.

By this constitution, the catalyst can be heated to the temperature suitable for each reaction in each reaction part, and the time required until stable feeding of hydrogen can be further shortened.

Since the relative amount of fed hydrogen decreases by feeding air to each reaction part, it is preferable to provide sufficient heat dissipation-preventing measures to each reaction part and gas feeding route from the viewpoint of reduction in the amount of air to be fed. For example, each reaction part and gas feeding route may be covered with a heat insulating material.

EXAMPLE 2

The hydrogen generating apparatus according to Embodiment 2 described above was allowed to operate.

The apparatus was operated in the same manner as in Example 1 described above except that air was fed to raw materials before introduced into the reforming part 2 in starting up and a part of the raw materials was oxidized in the reforming part 2. It was confirmed that by feeding air to raw materials before introduced into the reforming part 2, the catalyst temperature in the reforming part 2 reached to the set temperature more quickly as compared with Example 1.

By using platinum group-type catalysts in the reforming part 2, the shifting part 6 and the purification part 10 as in the present example, oxidation with air of the reformed gas and fuel (hydrocarbon), which are raw materials, can proceed quickly.

Particularly, by adopting a constitution in which catalysts mainly composed of platinum are commonly used, recycle of the catalysts is easy in recovering catalysts. Further, reduction treatment of catalysts is not needed and oxidation of catalysts does not occur easily by mixing of air after stopping of the apparatus, leading resultantly to easy maintenance.

Further, catalysts other than platinum group-type catalysts may be used in the reforming part 2, shifting part 6 and purification part 10, in the range wherein the effect of the present invention is not lost. For example, catalysts suitable for respective reactions may be appropriately selected by those skilled in the art, such as nickel-type catalysts for the reforming part 2, copper-type catalysts for the shifting part 6 and gold-type catalyst for the purification part 10, and the like.

Further, the catalyst temperature for each reaction part may advantageously be set depending on the kind of the catalyst used, and as the raw material fuel, there may be used any material usually used as a raw material of steam reforming, such as, in addition to methane, natural gas, hydrocarbons such as LPG and the like, alcohols such as methanol, naphtha and the like.

According to Embodiments 1 and 2 of the present invention, a part of oxygen in air fed and raw materials or reformed gas are oxidized by using the catalyst in the reforming part, shifting part or purification part, to generate oxidation heat. This heat enables quick heating of the catalyst in each reaction part up to the temperature suitable for the reaction. Further, since oxidation heat on the reforming catalyst, shifting catalyst and purification catalyst is utilized for heating, the amount of heat generation can he controlled by the amount of air to be fed and the catalyst temperature can be controlled easily.

Moreover, the time required until stable hydrogen feeding is obtained in starting lip of the apparatus can be shortened significantly and change in the catalyst temperature in each reaction part in changing of the amount of hydrogen generated can be dealt with appropriately.

Also, a relatively simple apparatus Constitution is possible in which the shifting part and the purification part need no special heating means.

Embodiment 3

Another embodiment of the hydrogen generating apparatus of the present invention will be explained below. The explanation will be made sequentially along the flow of a fuel (raw material gas) in the hydrogen generating apparatus of the present invention referring to a drawing for easy understanding.

Figure 3:
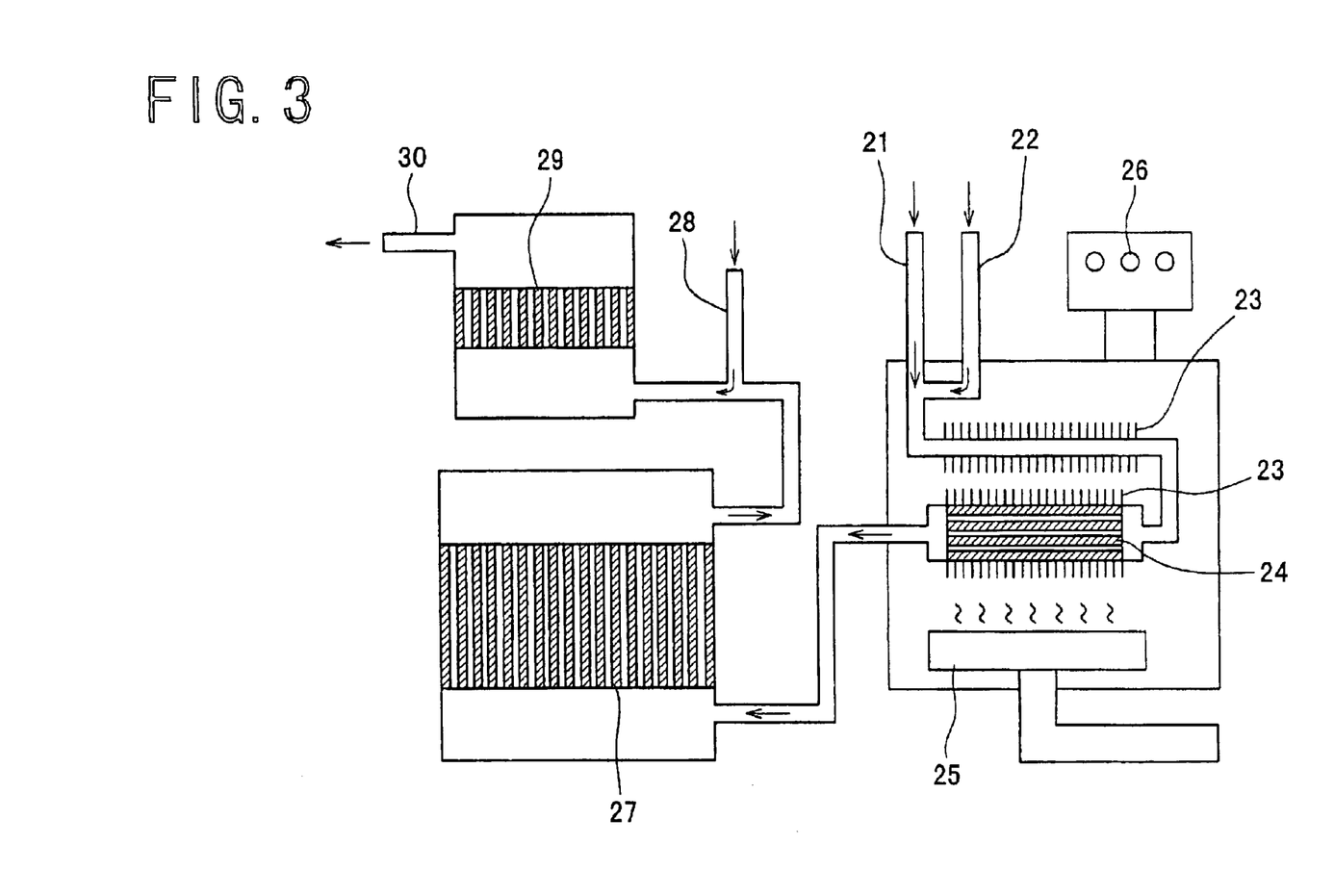
FIG. 3 is a schematic view showing the constitution of a hydrogen generating apparatus of still another embodiment in accordance with the present invention.

FIG. 3 is a schematic view showing the constitution of one example of a hydrogen generating apparatus of the present invention.

In the hydrogen generating apparatus shown in FIG. 3, a fuel is introduced though a fuel feeding part 21, and steam is added through a water feeding part 22 for fuel reforming. A raw material gas prepared by mixing the fuel and steam is heated by passing through a flow route having a heat exchange fin 23. The raw material gas comes into contact with a reforming catalyst body 24 heated by a heating burner 25 and reacts therewith, to produce a reformed gas. In this operation, a combustion gas is discharged from an exhaust port 26. Then, the amount of CO contained in this reformed gas is reduced by a CO shifting catalyst body 27. Further, since CO is required to be removed to several ppm level for use in a solid polymer fuel cell, a small amount of an oxidant gas such as air and the like is introduced through a CO purifying oxidant gas-feeding part 28, and CO is oxidized to be removed by using a CO purification catalyst body 29. A reformed gas from which CO has been removed is fed through a reformed gas outlet 30 to a fuel cell for example.

The fuel to be introduced through the fuel feeding part 21 is not particularly restricted providing it can feed hydrogen, and examples thereof include various fuels of hydrocarbon type, ether type and alcohol type such as natural gas, coal gas, liquefied petroleum gas, propane gas, kerosene, gasoline, methanol and dimethyl ether and the like. There can also be used oil gases obtained by thermal cracking of petroleum and town gases prepared by mixing liquefied petroleum gas. Of them, a town gas is composed of methane as a main component and can be used in the same like manner as natural gas.

In the present invention, hydrogen can be generated by reforming the above-described fuel, and as this reforming method, there can be used any reforming method such as a steam reforming method in which steam is added, a partial reforming method in which air is added, reforming methods composed of combination is thereof, and the like.

Therefore, it may be permissible that steam is added through the water feeding part 22 or a mixture of air and steam is also added, depending on the kind of the above-described reforming method.

The feeding ratio of a fuel to steam differs depending on the kind of the fuel the kind of the reforming method and the like, and it may be advantageous that the ratio is not less than the stoichiometric ratio for conversion of a fuel into $CO_2$ and hydrogen and within the range in which the efficiency does not decrease. Specifically, it may be advantageously from 1 to 3 in terms of the stoichiometric ratio.

When a steam reforming method is used as the reforming method, it may be advantageously within the ranges described below, for example.

| Kind of fuel | Feeding amount per fuel 1 |
|---|---|
| Natural gas | 2~5 |
| Propane gas | 6~15 |
| Kerosene | 20~40 |
| Gasoline | 16~32 |
| Methanol | 1~2 |
| Dimethyl ether | 31~26 |

The term "reformation" generally means an operation to generate hydrogen from a fuel and steam or an oxidant gas (for example, oxygen) or to change the composition of a hydrocarbon as the fuel by utilizing heat or a catalyst to improve the properties and conditions thereof. In the present invention, it means that hydrogen is generated from a fuel and steam and/or an oxidant gas.

A raw material (mixed) gas composed of a fuel and steam introduced through the fuel feeding part 21 and the water feeding part 22, then, passes through a flow route equipped with a heat exchange fin 23 and comes into contact with a reforming catalyst body 24. The flow route may advantageously be constituted of a conventionally known material such as a metal like stainless steal (copper, aluminum or the like is possible in the case of lower temperature) for example, and the heat exchange fin, 23 may also be constituted of a conventionally known material.

The reforming catalyst body 24 plays a role that the above-described raw material gas is heated with a heating burner 25 and further is allowed to contact with the reforming catalyst to reform the fuel to generate a hydrogen gas.

In the present invention, the structure of this reforming catalyst body has the feature. Namely, the present inventors have intensively studied for solving a problem that a conventionally used catalyst body in the form of a pellet tends to collapse, and resultantly, found a reforming catalyst body having a structure as described below.

That is, the reforming catalyst body 24 is constituted by allowing catalyst components to be carried on a carrier having a honeycomb structure, foamed body structure of corrugated structure.

By adopting such structure, collapse as in a conventional catalyst body does not occur, and properties can be stabilized for a long, period of time. Further, since contact area with a raw material gas increases as compared with a conventional catalyst body in the form of a pellet, there are merits that an efficient reaction can be effected, the amount of catalysts can be reduced, and the heat capacity of a catalyst body can also be decreased.

Further, since the surface area per volume is large, there are merits that heat dissipation by radiation and convection is large and heat-conductivity is also high, and further, heat from the heating burner 5 transfers uniformly to all over the reforming catalyst and the reaction heat can be removed quickly.

Then, a method for producing the reforming catalyst body 24 will be explained.

The reforming catalyst body 24 can be produced by mixing a powder of a reforming catalyst (catalyst component) with a dispersing medium to prepare a slurry, coating this slurry oil a carrier, then drying the coated slurry.

The reforming catalyst is not particularly restricted providing it has a function to generate hydrogen from a fuel and steam and/or oxygen, and examples thereof include Ni-type catalysts Such as nickel carried on alumina, noble metal catalysts such as ruthenium carried on alumina, rhodium carried on alumina and the like.

In the present invention, this reforming catalyst is ground by an ordinary method to give a powder. The particle size of this powder is not particularly restricted providing it is in the range wherein dispersibility is not disturbed when a slurry is produced and releasing does not occur when carried on a carrier. Specifically, the range from 1 to 2 $\mu$m may be allowable, for example.

The dispersing medium which disperses a reforming catalyst body is not particularly restricted providing it can be evaporated easily after the resultant slurry is coated on a carrier. Specifically, water, alcohol and the like are exemplified, for example.

The carrier used in the present invention has a honeycomb structure, foamed body structure or corrugated structure. It is because, contact area with a raw material gas is increased, as described above. In the foamed body structure, it is preferable that bubbles communicate each other since when bubbles are closed, the raw material gas does not pass easily.

The material of the carrier is not particularly restricted providing it is stable under hydrogen rich atmosphere or high temperature use condition, and examples thereof include heat-resistant inorganic materials such as cordierite, alumina, silica alumina and mullite, high heat-conductive materials such as silicon carbide, metal materials such as various stainless steels, and the like.

The above-described heat-resistant inorganic material has a merit that when used for a long period of time under high temperature condition, stable function is maintained (kept).

The above-described high temperature-conductive inorganic material has a merit that the temperature distribution of the resultant reforming catalyst body 24 is uniformed, and temperature control thereof becomes easy, enhancing the reaction efficiency.

When the above-described metal material is used, there is a merit that molding is easy and extremely high resistance against vibration is obtained.

Further, such a carrier may advantageously be produced from the above-described materials by conventional methods such as extrusion molding, soldering, casting and the like.

Coating of a slurry on the above-described carrier may advantageously be effected by known methods conventionally used in the fields of a paint and the like, and examples thereof include a spray method, roll method and the like.

The drying may be natural drying or heat drying. When the heating temperature is raised too much, the function of a catalyst may be possibly disturbed, requiring caution.

The amount of coating of a reforming catalyst component onto a carrier may be appropriately selected by those skilled in the art, though it differs depending on the kind of the catalyst component, the king of fuel gas and the like.

The heating temperature of the reforming carrier 24 obtained as described above when a raw material gas passes through differs depending on the king of a fuel, the kind of the reforming catalyst and the like, and generally may be a temperature at which a fuel causes a reforming reaction generating a hydrogen gas.

Heating, temperature ranges for respective kinds of fuels are exemplified below.

| Kind of fuel | Heating temperature ranges |
|---|---|
| Natural gas | 500~800 |
| Propane gas | 500~800 |
| Kerosene | 500~800 |
| Gasoline | 500~800 |
| Methanol, Dimethyl ether | 200~400 |

When a raw material as passes through the reforming catalyst body 24, it becomes a reformed gas which usually contains CO in addition to hydrogen (for example, about 10% CO is contained when natural gas is used as a fuel and reforming is conducted at a temperature from 500 to 800° C.). On the other hand, when hydrogen obtained in the hydrogen generating apparatus of the present invention is used for example in a solid polymer type fuel cell, it is necessary that the CO concentration is reduced to about several thousands ppm to 1%. Therefore, this reformed gas is passed through a CO shifting catalyst body 27 to reduce the CO concentration in the reformed gas to about several thousands ppm to 1%.

The production method and the like of the CO shifting catalyst body 27 are the same as those in the case of the above-described reforming catalyst body 24 except that the kinds of catalysts used are different.

The CO shifting catalyst herein used is not particularly restricted providing it has a function to cause a reaction between CO and steam to give $CO_2$ and hydrogen, and examples thereof include Cu—Zn-type catalysts, Fe—Cr-type catalysts and the like, usually used. Namely, the "CO shifting" herein referred to means a procedure in which CO and steam are reacted to give $CO_2$ and hydrogen, and the high concentration (for example, 10%) of CO is lowered to the low concentration (for example, 1 to 2% or lower).

Further, when methanol, dimethyl ether and the like are used as the fuel, reforming can be conducted at relatively lower heating temperature and the concentration of CO contained in the reformed gas becomes relatively lower. In such a case, the CO shifting catalyst body 27 may be eliminated and a CO purification catalyst body 29 described later is only provided.

Further, when hydrogen is used in a solid polymer fuel cell, it is said to be desirable that the CO concentration is reduced to several ppm level. Therefore, in the hydrogen generating apparatus of the present invention, a reformed gas which has passed through the CO shifting catalyst body 27 is passed through a route to reach the CO purification catalyst body 29, to oxidizing and removing CO contained in a trace amount. In this procedure, oxygen is necessary for oxidation of CO and, therefore, an oxidant gas-feeding part for purification 28 is provided on the way of a route from the shifting catalyst body 27 to the purification catalyst body 29. A reformed gas which has passed through the CO shifting catalyst body 27 is allowed to contact together with air to the CO purification catalyst body 29.

The production method and the like of the CO purification catalyst body 29 are the same as those in the case of the above-described reforming catalyst body 24 except that the kinds of catalysts used are different. The CO purification catalyst herein used is not particularly restricted providing it has a function to cause selective oxidation of CO contained in the reformed gas or a function to cause a reaction between CO and hydrogen for methanization, and examples thereof include Pt-type catalysts, Ru-type catalysts and the like carried on alumina. When hydrogen obtained from the hydrogen generating apparatus of the present invention is used in fuel cell which can operate even when it contains several hundreds ppm to several thousands ppm of CO, the CO purification catalyst body 29 can be eliminated. A reformed gas which has passed through the CO purification catalyst body 29 thus obtained can be taken from the reformed gas outlet 30 and fed to, for example, a fuel cell and the like.

In the hydrogen generating apparatus of the present invention, it is preferable that outer sides of chambers, flow routes and the like containing catalyst bodies are covered with a heat insulating material.

Further, since the reforming catalyst body 24, the CO shifting catalyst body 27 and the CO purification catalyst body 29 are different in the optimum temperature distribution and heat conducting condition, it is also effective that separate materials are selected for use from heat-resistance inorganic materials, metal materials and high heat-conductive inorganic materials, such as use of a metal carrier having a honeycomb structure excellent in heat-conductivity for the reforming catalyst body 24, used of a cordierite carrier having a honeycomb structure for the CO shifting catalyst body 27 and the CO purification catalyst body 29, and the like.

Further, when a carrier having a honeycomb structure is used, composite-forming in the same catalyst body may also be an effective means for improving temperature distribution, such as placing of a metal rod in the center part thereof, constitution of the upstream part and the downstream part with different materials, and the like.

Air is added instead of steams through the water feeding part 22 for conducting partial reforming, the proportion of hydrogen contained in the reformed gas decreases, however, a combustion reaction occurs simultaneously with reforming in the reforming catalyst body 24, rendering heating of the catalyst body easy. Also in this case, by using a carrier having a honeycomb structure, the contact area between the raw material as and the reforming catalyst body increases, and the effective reaction becomes possible.

When air and steam are added simultaneously, intermediate properties between steam reforming and partial reforming are obtained.

Further, chambers, flow routes and the like containing therein catalyst bodies can be produced from materials such as, for example, stainless steal and the like by an ordinary method.

The following examples will illustrate the present invention below, but do not limit the scope of the present invention.

EXAMPLE 3

Pelletized catalysts for reforming, CO shifting and CO purification were respectively ground (particle size: about 1 $\mu$m), and dispersed in water in a ratio of catalyst component:water of 1:2 (by weight) and made into slurries. These slurries were coated on carriers made of cordierite having a honeycomb structure, to obtain a reforming catalyst body 24, a CO shifting catalyst body 27 and a CO purification catalyst body 29.

These catalyst bodies were incorporated into a hydrogen generating apparatus shown in FIG. 3. A de-sulfurized town gas was introduced through the fuel feeding part 21 at a flow rate of 50 liter per minute and steam was introduced through the water feeding part 22 at a flow rate of 150 liter per minute, and they were heated for reaction by a heating burner 25 so that the temperature of the reforming catalyst body 24 reached about 800° C.

The composition of the produced gas excepting steam after passing through the reforming catalyst body 24 was measured by gas chromatography to find about 80% hydrogen, about 12% CO, about 8% carbon dioxide and 500 ppm methane.

When this reformed gas was passed through the CO shifting catalyst body 27, the CO concentration became about 3000 ppm, and further, air was introduced though an oxidant as feeding part 28 so that the oxygen concentration reached 2% and was reacted by using the CO purification catalyst body 29 to find a CO concentration of 5 ppm.

The hydrogen generating apparatus was stopped once, then, started. Further, the stopping and starting operation was repealed 1500 times and the reformed gas composition was measured to find that methane concentrations was 800 ppm after passing the reforming catalyst body 24, about 4500 ppm after passing the CO shifting catalyst body 27, and 7 ppm after passing the CO purification catalyst body 29.

EXAMPLE 4

The hydrogen generating apparatus obtained in Example 3, a fuel cell and a driving motor were connected and mounted on an automobile, and a 100000 km driving test was conducted.

After the driving, the composition of the reformed gas was measured by gas chromatography in the same manner as in Example 3 to find that a methane concentration was 1000 ppm after passing the reforming catalyst body 24, a CO concentration was about 4800 ppm after passing the CO shifting catalyst body 27, and a CO concentration was 9 ppm after passing the CO purification catalyst body 29.

EXAMPLE 5

The hydrogen generating apparatus was operated in the same manner as in Example 3 except that a Fe—Cr—Al type stainless steel was used instead of cordierite as the material of a carrier having a honeycomb structure.

The composition of the produced gas excepting steam after passing through the reforming catalyst body 24 was measured by gas chromatography to find about 80% hydrogen, about 12% CO, about 8% carbon dioxide and 300 ppm methane.

When this reformed gas was passed through the CO shifting catalyst body 27, the CO concentration became about 2500 ppm, and further, air was introduced though the oxidant gas feeding part 28 so that the oxygen concentration reached 2% and was reacted by using the CO purification catalyst body 29 to find a CO concentration of 3 ppm.

The hydrogen generating apparatus was stopped once, then, started. Further, the stopping and starting operation was repeated 1500 times and the reformed gas composition was measured to find methane concentrations of 700 ppm after passing the reforming catalyst body 24, of about 4000 ppm after passing the CO shifting catalyst body 27, and of 6 ppm after passing the CO purification catalyst body 29.

COMPARATIVE EXAMPLE 1

Figure 4:
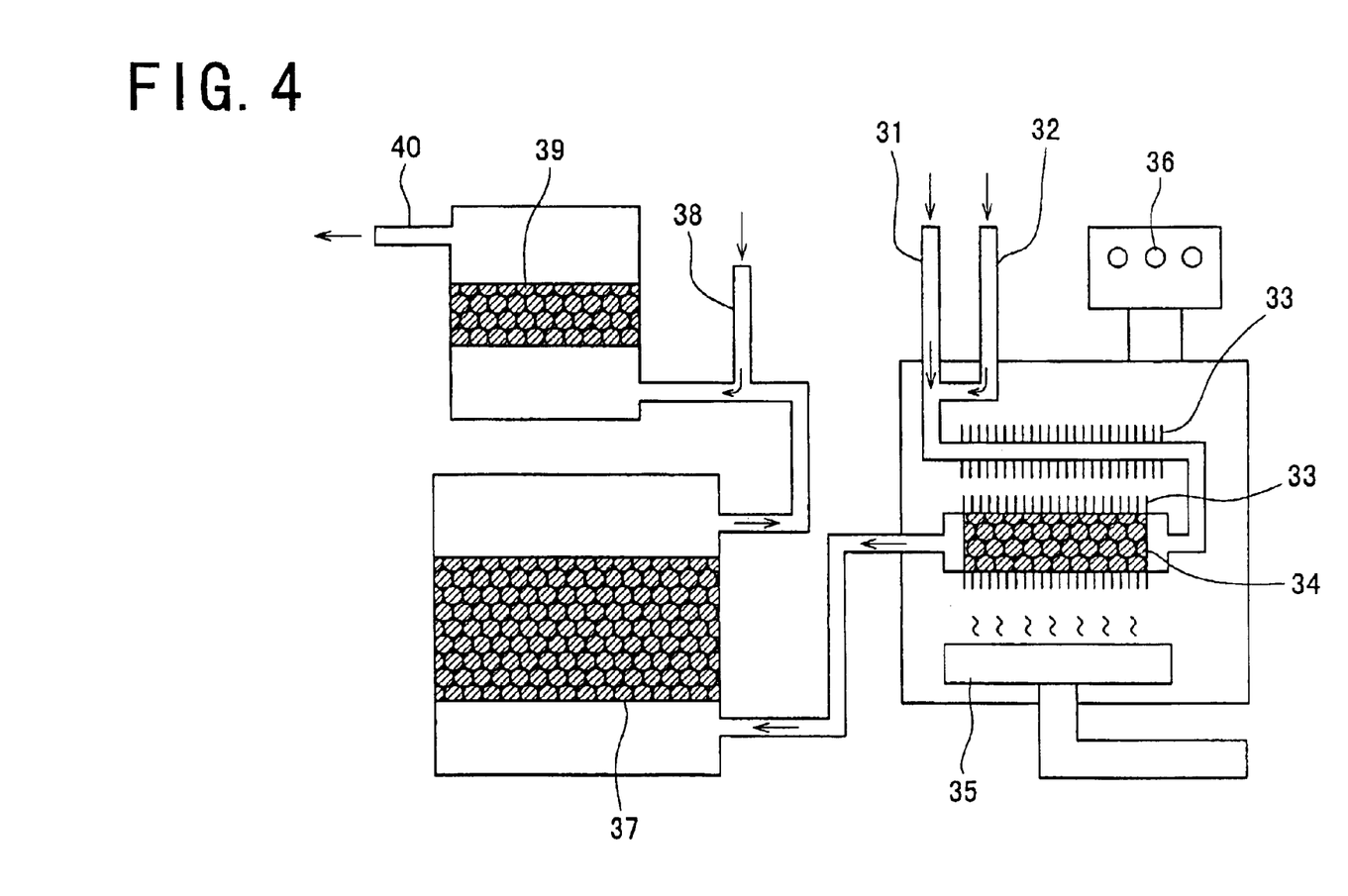
FIG. 4 is a schematic constitution view of a hydrogen generating apparatus of a comparative example 1.

Pelletized catalysts for reforming, CO shifting and CO purification used in Example 3 were filled, without grinding, into chambers as shown in FIG. 4, and a de-sulfurized town as was introduced through a fuel Feeding part 31 at a now rate of 50 liter per minute and steam was introduced through a water feeding part 32 at a flow rate of 150 liter per minute. The town gas was heated by passing through a flow route having a heat exchange fin 33.

A reforming catalyst body 34 was heated for reaction by a heating burner 35 and a combustion gas is discharged from an exhaust port 36 in the same manner as in Example 3. The composition of the produced gas after passing through the reforming catalyst body 34 excepting steam after passing through the reforming catalyst body 34 was measured by gas chromatography to find about 80% hydrogen, about 12% CO, about 8% carbon dioxide and 600 ppm methane.

When this reformed gas was passed through a CO shifting catalyst body 37, the CO concentration became about 3500 ppm. Further, when air was introduced though an oxidant gas feeding part 38 so that the oxygen concentration reached 2% and was reacted by using a CO purification catalyst body 39, a CO concentration became 6 ppm. A reformed gas from which CO has been removed is fed through a reformed gas outlet 40 to a fuel cell for example.

Then, the hydrogen generating apparatus was stopped, then, started. Further, the stopping and starting operation was repeated 1500 times and the reformed gas composition was measured to find a methane concentrations of 9000 ppm after passing the reforming catalyst body 34, a CO concentration of about 14500 ppm after passing the CO shifting catalyst body 37, and a CO concentration of 5500 ppm after passing the CO purification catalyst body 39. The pelletized body was taken out of the reaction chamber and observed to find that a part of the palletized catalyst collapsed to be a size about three-forth of the original size.

COMPARATIVE EXAMPLE 2

The hydrogen generating apparatus in Comparative Example 1, a fuel cell and a driving motor were connected and mounted oil an automobile, and a 100000 km driving test was conducted like in Example 4.

After the driving, the composition of the reformed gas was measured by gas chromatography to find a methane concentration of 20000 ppm after passing the reforming catalyst body 34, a CO concentration of about 16000 ppm after passing the CO shifting catalyst body 37, and a CO concentration of 9000 ppm after passing the CO purification catalyst body 39.

The palletized catalyst body was taken out of the reaction chamber and observed to find that the palletized catalyst collapsed significantly to be a size about a half of the original size.

As is apparent from the comparison between the evaluation results of examples and comparative examples, according to Practical Embodiment 3 of the present invention, a hydrogen generating apparatus can be provided which elongates the life of a catalyst, suppresses influences by stopping of operation of an apparatus, repetition of operation and vigorous vibration, and operate for a long period of time in a stable manner.

Embodiment 4

Embodiment 4 of the present invention will be illustrated referring to drawings below.

Figure 5:
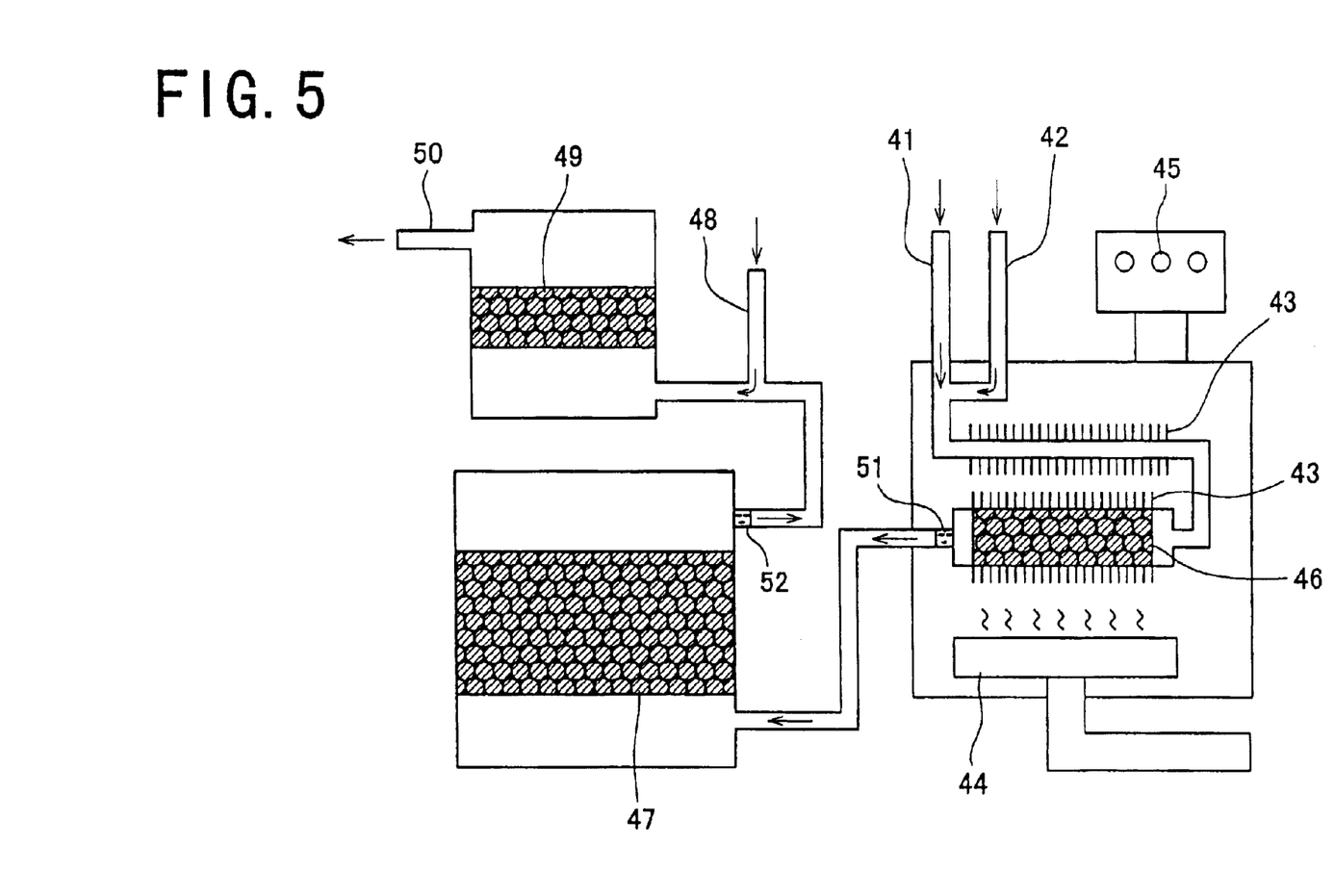
FIG. 5 is a schematic constitution view of a hydrogen generating apparatus of another embodiment in accordance with the present invention.

FIG. 5 is a schematic constitution view of Embodiment 4 of a hydrogen generating apparatus of the present invention.

In the hydrogen generating apparatus shown in FIG. 5, a fuel is introduced through a fuel feeding part 41 and steam is added through a water feeding pail for fuel reforming 42. A raw material gas prepared by mixing the fuel and stead passes through a flow route having a heat exchange fin 43. The raw material gas comes into contact with a reforming catalyst body 46 heated by heating burner 44 and reacts therewith, to produce a reformed gas. In this operation, a combustion gas is discharged from a discharging port 45. Then, the amount of CO contained in this reformed gas is reduced by a CO shifting catalyst body 47. Further, since CO is required to be removed to several ppm level for use in a solid polymer fuel cell, a small amount of air is introduced through a CO purifying oxidant gas-feeding part 48, and CO is oxidized to be removed by using a CO purification catalyst body 49. A reformed gas from which CO has been removed is fed through a reformed gas outlet 50 to a fuel cell for example.

A first filter 51 and a second filter 52 are placed respectively at the downstream side of the reforming catalyst body 46 and the CO shifting catalyst body 47.

For keeping the reaction vessel at constant temperature, parts of the apparatus may be covered with heat insulation materials. The catalyst body may be conventional one, and it is preferable to use a Ni catalyst for the reforming catalyst body, a Cu—Zn catalyst for the CO shifting catalyst body, and a Pt catalyst for the CO purification catalyst body, respectively.

Examples of the fuel for generating a reformed gas are town gas (natural gas), propane, kerosene, gasoline, methanol, dimethyl ether and the like. As the reforming method, there are a steam forming method in which steam is added, a partial reforming method in which air is added, reforming methods composed of combinations thereof, and the like.

Herein, a case in which natural gas is used as the fuel gas and steam-reforming is conducted will be described as a typical example. However, reforming methods using other fuel or composed of partial reforming or a combination of partial reforming and steam reforming can be applied to the present method though the composition of the resulting reformed gas differs slightly and the temperature condition in reforming changes.

Operation and characteristics of a hydrogen generating apparatus according to Practical Embodiment 4 will be illustrated.

A fuel is introduced through a fuel feeding part 41 and steam in an amount of about 3-fold based on the fuel is added through a water feeding part 42. The mixed raw material gas is heated by a heating burner 44, and comes into contact with a reforming catalyst body 46 which has been heated to about 500 to 800° C. and reacts, to produce a reformed gas. Since this reformed gas contains CO in an amount of about 10% in addition to hydrogen, the concentration of carbon monoxide is reduced to about several thousands ppm to 1% by using a CO shifting catalyst body 47. Further, when the resulted hydrogen gas is used in a solid polymer fuel cell, it is necessary that the CO concentration is reduced to about several ppm, therefore, a small amount of air is introduced through an oxidant gas feeding pail 48 and CO is oxidized to be removed by using a CO purification catalyst body 49. The reformed gas from which CO has been removed is fed through a reformed gas outlet 50 to a fuel cell.

As described above, in the case of a fuel cell system for automobile uses or domestic uses, frequent starting up and stopping should be repeated, and in this operation, significant heat impact is imparted to each catalyst body. Particularly in the case of automobile uses, vibration is applied to catalyst bodies in driving. If an apparatus is operated for a long period of time under such conditions, a catalyst body is cracked gradually and fine powder may be formed. At that time, there is no significant influence on the reactivity of a catalyst body itself, however, a catalyst powder fallen from the catalyst body flies or scattered to the downstream side. When a catalyst powder is thus scattered, the powder is collected mainly onto a catalyst body situated at the downstream side of the catalyst body caused the scattering. Specifically, the reforming catalyst is collected on a CO shifting part, and a CO shifting catalyst is collected on a CO purification part.

Usually, since a catalyst which can be applied as a reforming catalyst for a hydrocarbon acts as a methanization catalyst under temperature condition wherein a CO shifting catalyst acts, a catalyst powder scattered from a reforming catalyst body consequently reduces the methane conversion. Further, also when a powder scattered from a CO shifting catalyst body is collected on a CO purification catalyst body, bad influences are exerted likewise. In the CO purification part, CO is selectively oxidized by addition of air, however, a CO shifting catalyst collected on a CO purification catalyst body reduces the selectivity of CO oxidation and simultaneously, a CO shifting catalyst reached near the downstream part of the CO purification catalyst causes a reaction between carbon dioxide and hydrogen by a reverse shift reaction and increases the CO concentration.

On the other hand, when a first filter 51 and a second filter 52 are placed respectively at the downstream side of a reforming catalyst body and a CO shifting catalyst body, as in Embodiment 4, the apparatus can be operated for a long period of time in a stable manner without a scattered catalyst powder being collected on a CO shifting catalyst body and a CO purification catalyst body as described above.

In this case, it is preferable that the first filter 51 at the downstream side of the reforming catalyst body 46 is set at a temperature wherein the methanization reaction does not proceed substantially. Since the methane reforming reaction is an equilibrium reaction depending on temperature, the methanization reaction proceeds in the temperature range from about 300 to 400° C. Accordingly, the methane conversion decreases. In the present embodiment, it is preferable that the first filter 51 is placed near and downstream of the reforming catalyst body 46 to control the temperature of the filter 51 near that of the reforming catalyst body 46. The temperature wherein the methanization reaction does not progress substantially means a temperature range wherein the methane concentration does not usually exceed 1 to 5%, depending on the methane conversion of the intended apparatus.

As the above-described first filter 51 and second filter 52, filters can be used constituted of fiber composed of a metal, ceramics or complex thereof. It is also preferable to use filters in the form of mesh, honeycomb or foam composed of a metal, ceramics or complex thereof.

For producing the filter, wool composed of a heat-resistant material such as stainless steal, glass or quartz may be installed in a tube to provide a thickness of several cm or may be compressed and molded into a thickness of several mm.

These are structures which can collect a scattered catalyst particle, and fully cheap materials under use conditions. There is an effect that the surface is porous and a half or more of the catalyst scattered before passing through is collected.

In the practical embodiment, the first filter 51 and second filter 52 are placed in ordinary narrow routes, however, the route at the filter part can be thickened so that the filter area increases, and the filter can be bent to suppress increase in pressure loss of the filter due to clogged catalysts.

Since pressure loss increases by clogging of the filter, it is preferable to place pressure detecting instruments at the upstream side and the downstream side of the first filter 51 and the second filter 52. When the pressure loss increases, pumps for feeding fuels and the like are loaded, decreasing efficiency. Therefore, by detecting pressures before and after the filters, pressure loss by the first filter 51 and the second filter 52 is measured, and when it reaches the pre-determined standard value, the filter can be exchanged for operation of the hydrogen generating apparatus for a long period of time in a stable manner.

In the present embodiment, since it is required that a solid polymer cell is used as the fuel cell and the CO concentration is reduced to ppm level, a CO purification catalyst body may be dispensable if the fuel cell part acts with a reformed gas containing CO in an amount from several hundreds to several thousands ppm, as described in the case wherein a reforming catalyst body, a CO shifting catalyst body and a CO purification catalyst body are all provided.

When a fuel such as methanol and dimethyl ether is used, reforming is possible at a lower temperature around 300° C., and the CO concentration after reforming relatively decreases, therefore, there is also a case in which operation is possible only with a CO purification catalyst body even without employing a CO shifting catalyst body. In this case, since a catalyst similar to a CO shifting catalyst, for example, a copper-zinc-type catalyst is used as the reforming catalyst, the scattered catalyst powder has the same influence with the scattered CO shifting catalyst of the present example, and it is preferable to place a filter downstream of the reforming catalyst body.

In the present embodiment, an example in which a fuel is steam-reformed is described, however, when partially reforming is conduced while adding air instead of steam, the proportion of hydrogen contained in the reformed gas decreases, and a combustion reaction occurs simultaneously with reforming on the catalyst and heating of the catalyst body becomes easy. Still more, when air and steam are added simultaneously, intermediate properties between the steam reforming and the partial reforming are obtained.

Further, it is preferable to use a Ni catalyst for the reforming catalyst body, a Cu—Zn catalyst for the CO shifting catalyst body, and a Pt catalyst for the CO purification catalyst body, respectively, however, in the present invention, catalysts are not restricted particularly to the above-described examples providing they have activities to the reforming reaction, CO shifting reaction and CO purification reaction.

A catalyst in the form of a pellet is used as the catalyst body, however, other forms may also be used, such as a catalyst body carried on honeycomb.

In the present practical embodiment, filers are used as scattering preventing means in the present invention, however, there are also other possible means such as a method in which a band is formed to be collected on the way of the route downstream of the catalyst body utilizing the flow of a reformed gas, a method in which the inner surface of the route is processed by surface treatment for absorption of a powder, providing they are means for preventing scattering of a catalyst powder.

Embodiment 5

Figure 6:
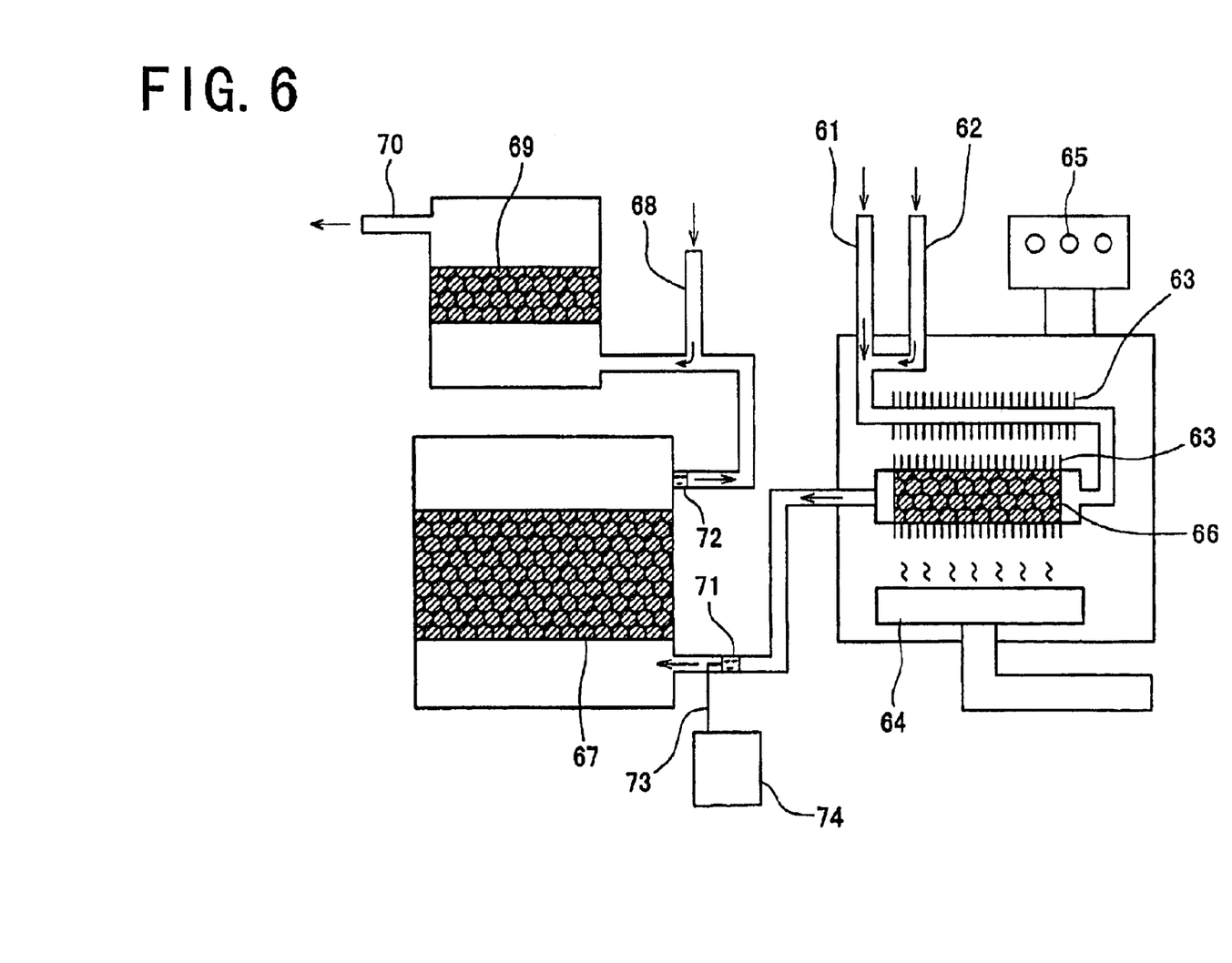
FIG. 6 is a schematic constitution view of a hydrogen generating apparatus of another embodiment in accordance with the present invention.

Embodiment 5 of the present invention will be illustrated. In the present practical embodiment, as shown in FIG. 6, thermocouple 73 and measuring apparatus 74 connected to the thermocouple 73 are placed near a first filter 71, and the first filter 71 at the downstream side of a reforming catalyst body is set at a temperature wherein the methanization reaction progresses substantially. A second filter 72 is placed at the downstream side of a CO shifting catalyst body 67, as in Embodiment 4. Further, air is introduced through a CO purifying oxidant gas-feeding part 68, and CO is oxidized to be removed by using a CO purification catalyst body 69. A reformed gas from which CO has been removed is fed through a reformed gas outlet 70 to a fuel cell for example. Most of the actions and effects of the present embodiment are the same as those in Embodiment 4. Therefore, the present embodiment will be illustrated mainly on different parts.

FIG. 6 is a schematic constitution vies of the present embodiment. The first filter 71 is placed near the intermediate part between a reforming catalyst body 66 and a CO shifting catalyst body 67, and the temperature thereof is in the range from 400 to 500□ C. which is also sandwiched between them. When the first filter 71 collects the scattered catalyst from the reforming catalyst body 66, heat generation occurs since the temperature of the first filter 71 is a temperature at which the methanization proceeds. The heating value is in proportion with the amount of the scattered catalyst collected on the first filter 71, and by detecting the temperature by thermocouple 73 placed near the first filter 71, the amount of the scattered catalyst collected on the first filter 71 can be estimated. When the temperature of the first filter 71 reached the standard value previously determined, if the filter is exchanged, the hydrogen generating apparatus can be operated for a long period of time in a stable fashion.

In the present embodiment, the thermocouple are placed near and at the downstream of the filter as shown in FIG. 6, however, the thermocouple can be placed near and at the upstream side, on the side face or outside of the tube, depending on the constitution. As the temperature detecting apparatus, there can also be used detecting means which detect temperature giving signals, such as thermistors, bimetals and the like.

The following examples illustrate Embodiments 4 and 5 of the present invention more specifically, but dot not limit the scope thereof.

EXAMPLE 6

A reforming catalyst body 46 composed of a Ni-type reforming catalyst, a shifting catalyst body 47 composed of a Cu—Zn-type CO shifted catalyst, and a purification catalyst body 49 composed of a Pt-type CO selective oxidation catalyst were respectively filled in a hydrogen generating apparatus shown in FIG. 5. A first filter 51 and a second filter 52 composed of stainless metal fiber having a line diameter of 0.1 $\mu$m were respectively laced at downstream side of the reforming catalyst body 46 and the CO shifting catalyst body 47. A de-sulfurized town gas was introduced through a fuel feeding part 41 at a flow rate of 50 liter per minute and steam was introduced through a water feeding part 42 at a flow rate of 150 liter per minutes and they were heated for reaction by a heating burner 44 so that the temperature of the reforming catalyst body 46 reached about 800° C.

The composition of the reformed gas excepting steam after passing through the reforming catalyst body 46 was measured by gas chromatography to find about 80% hydrogen, about 11% CO, about 9% carbon dioxide and 0.05% methane. Further, the CO concentration was 8 ppm after passing the purification catalyst body 49. And the temperatures of the first filter 51 and second filter 52 were measured to find they were 700° C. and 150° C., respectively.

The hydrogen generating apparatus was stopped once, then, started. Further, the stopping and starting operation was repeated 1500 times and the reformed gas composition was measured in a like manner. The methane concentrations in the gas before and after passing the first filter 51 and the methane concentrations in the gas after passing the CO shifting catalyst body 47 were all 0.06%. The CO concentration of the gas after passing the CO purification catalyst body 49 was 9 ppm. The pressures before and after the first filter 51 and the second filter 52 were measured and pressure losses were calculated based on the original pressures to find they were 20 mAq and 40 mAq, respectively. The filters were removed from the apparatus and weights of the catalyst powder adhered were measured to find that the increase in weight of the first filter 51 was 12 g and that of the second filter 52 was 38 g.

EXAMPLE 7

The hydrogen generating apparatus of Example 5, a fuel cell and a driving motor were connected and mounted on an automobile, and a 20000 km driving test was conducted. After the driving, the composition of the reformed gas was measured by gas chromatography in the same manner as in Example 5 to find that the methane concentrations in the gas before and after passing the first filter 51 and the methane concentrations in the gas after passing the CO shifting catalyst body 47 were all 0.08%. The CO concentration of the gas after passing the CO purification catalyst body 49 was 10 ppm.

EXAMPLE 8

As shown in FIG. 6, a first filter 71 was placed at the intermediate part between a reforming catalyst body 66 and a CO shifting catalyst body 67. Thermocouple 73 were placed so that they were in contact with the first filter 71, and signals of the thermocouple 73 were read by a measuring apparatus 74.

A de-sulfurized town gas was introduced through a fuel feeding part 61 at a flow rate of 50 liter per minute and steams was introduced through a water feeding part 62 at a flow rate of 150 liter per minute. The composition of the gas after passing through a flow route having a heat exchange fin 63 and a reforming catalyst body 66 was found to include about 80% hydrogen, about 11% CO, about 9% carbon dioxide and 0.05% methane. The reformed gas catalyst body 66 was heated for reaction by a heating burner 64 and a combustion gas was discharged from an exhaust port 65. Further, the composition of the gas after passing a CO shifting catalyst body 67 included 0.05% methane and 0.3% CO, respectively. Further, the CO concentration of the gas after passing a CO purification catalyst body 69 was 8 ppm.

The hydrogen generating apparatus was stopped once, then, started in the same manner as in Example 5. Further, the stopping and starting operation was repeated 1500 times and the reformed gas composition was measured. The methane concentrations in the gas after passing the reforming catalyst body 66 was 0.06%, and the methane concentration of the gas after passing the reforming catalyst body 66 was 5.5%. The CO concentration of the gas after passing the CO shifting catalyst body 67 was 0.3%, and the CO concentration of the gas after passing the CO purification catalyst body 69 was 10 ppm. The temperature of the first filter 71 was compared with the original value to find a increase of 150° C. The first filter 71 was removed from the apparatus and weight of the catalyst powder adhered was measured to find that the weight of the catalyst powder adhered to the first filter 71 was 12 g.

Then, the first filter 71 was changed to a new one, and the hydrogen generating apparatus was started tip again. The methane concentration of the gas before and after passing the first filter 71 and the methane concentration of the gas after passing the CO shifting catalyst body 67 were each 0.06%. The CO concentration of the as after passing the CO purification catalyst body was 9 ppm.

COMPARATIVE EXAMPLE 3

The first filter 51 and the second filter 52 were removed in Example 5 and town gas and water were reacted. A de-sulfurized town gas was introduced through the fuel feeding part 41 at a flow rate of 50 liter per minute and steam was introduced through the water feeding part 42 at a now rate of 150 liter per minute, and they were reacted. The composition of the reformed gas was found to include about 80% hydrogen, about 11% CO, about 9% carbon dioxide and 0.05% methane. Further, the composition of the gas after passing the CO shifting catalyst body 47 included 0.05% methane and 0.3% CO, respectively. Further, the CO concentration of the gas after passing the CO purification catalyst body 49 was 8 ppm.

The hydrogen generating apparatus was stopped once, then, started in the same manner as in Example 5. Further, the stopping and starting operation was repeated 1500 times and the reformed gas composition was measured. The methane concentrations in the gas after passing the reforming catalyst body 46 was 0.06%, and the methane concentration of the gas after passing the CO shifting catalyst body 47 was 5.5%/. Further, the CO concentration of the gas after passing the CO shifting catalyst 47 was 0.3%, and the CO concentration of the gas after passing the CO purification catalyst body 49 was 350 ppm.

As is apparent from the comparison between the evaluation results of Examples 6 to 8 and Comparative Example 3, the hydrogen generating apparatuses of Practical Embodiments 4 and 5 prevents influences by stopping of operation of an apparatus, repetition of operation and scatter of a catalyst due to vigorous vibration, and can be operated for a long period of time in a stable manner.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A hydrogen generating apparatus comprising a fuel feeding part, a water feeding part for fuel reforming, an oxidant gas feeding part, a reforming catalyst body, a heating part for said reforming catalyst, a CO shifting catalyst body and a CO purification catalyst body, the reforming catalyst body, the CO shifting catalyst body and the CO purification catalyst body being placed sequentially in order from said fuel feeding part toward the downstream side, wherein, a fuel and water are fed to said refolding part which has been heated, an oxidant gas from said oxidant gas feeding part is mixed with each of a reformed gas introduced into said shifting part and a shifted gas obtained in said shifting part and introduced into said purification part, and at least a part of said reformed gas and at least a part of said shifted gas are oxidized respectively in said shifting part and said purification part, and wherein a shifting catalyst of said shifting catalyst body contains as one component at least a platinum group catalyst.

2. The hydrogen generating apparatus in accordance with claim 1, wherein said apparatus has a shifting catalyst temperature measuring part to measure the temperature of said shifting catalyst body, and the temperature of the shifting catalyst is controlled by controlling the amount of an oxidant gas to be mixed with said reformed gas.

3. The hydrogen generating apparatus in accordance with claim 1, wherein said apparatus has a purification catalyst temperature measuring part to measure the temperature of said purification catalyst body, and the temperature of the purification catalyst is controlled by controlling the amount of an oxidant gas to be mixed with said shifted gas.

4. The hydrogen generating apparatus in accordance with claims 1, wherein an oxidant gas from said oxidant gas feeding part is mixed with a fuel and water from said fuel feeding part and the water feeding part.

5. The hydrogen generating apparatus in accordance with claim 4, wherein said apparatus has a reforming catalyst temperature measuring part which measures the temperature of said reforming catalyst body and the temperature of the reforming catalyst is controlled by controlling the amount of an oxidant gas to be mixed with said fuel and water.

6. The hydrogen generating apparatus in accordance with claim 1, wherein each of said reforming catalyst body, CO shifting catalyst body and CO purification catalyst body comprises a carrier having a honeycomb structure, foamed body structure or corrugated structure carrying a catalyst component.

7. The hydrogen generating apparatus in accordance with claim 1, wherein said water feeding part for fuel reforming feeds also air together with steam.

8. The hydrogen generating apparatus in accordance with claim 1, wherein said water feeding part for fuel reforming feeds only air.

9. The hydrogen generating apparatus in accordance with claim 1, wherein a scatter preventing means is provided at least between said reforming catalyst body and said CO shifting catalyst body or between said CO shifting catalyst body and said CO purification catalyst body.

10. The hydrogen generating apparatus in accordance with claim 9, wherein said scatter preventing means is a filter, and a pressure detecting apparatus which detects pressure loss of said filter is placed at the upstream side and at the downstream side of said filter.

11. The hydrogen generating apparatus in accordance with claim 10, wherein a temperature detecting apparatus is provided at a position near said filter.

* * * * *

UNITED STATES PATENT AND TRADEMARK OFFICE
CERTIFICATE OF CORRECTION

PATENT NO. : 6,733,552 B1  Page 1 of 1
DATED : May 11, 2004
INVENTOR(S) : Kiyoshi Taguchi et al.

It is certified that error appears in the above-identified patent and that said Letters Patent is hereby corrected as shown below:

Title page,
Item [57], ABSTRACT,
Line 13, "nixed" should read -- mixed --.

Signed and Sealed this

Twenty-third Day of November, 2004

JON W. DUDAS
*Director of the United States Patent and Trademark Office*